Dec. 2, 1924.
T. B. GILL
HAND TRUCK
Filed March 24, 1923
1,517,901
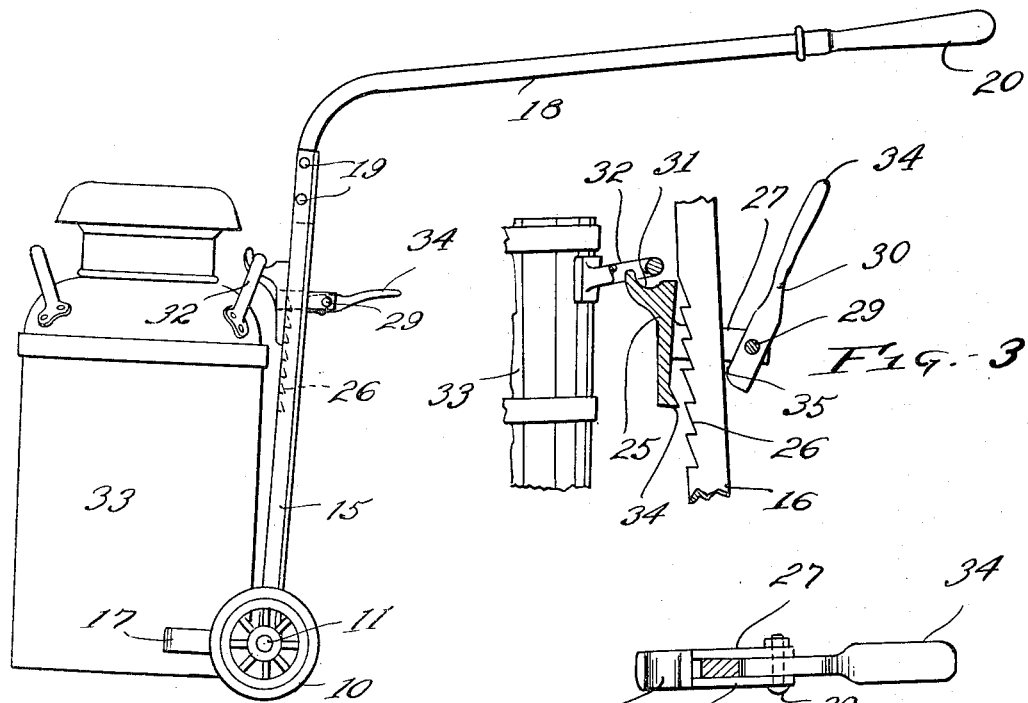
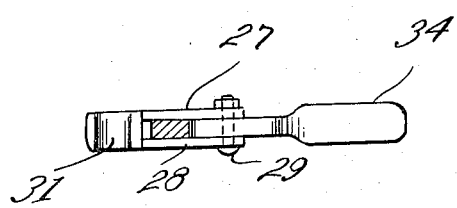
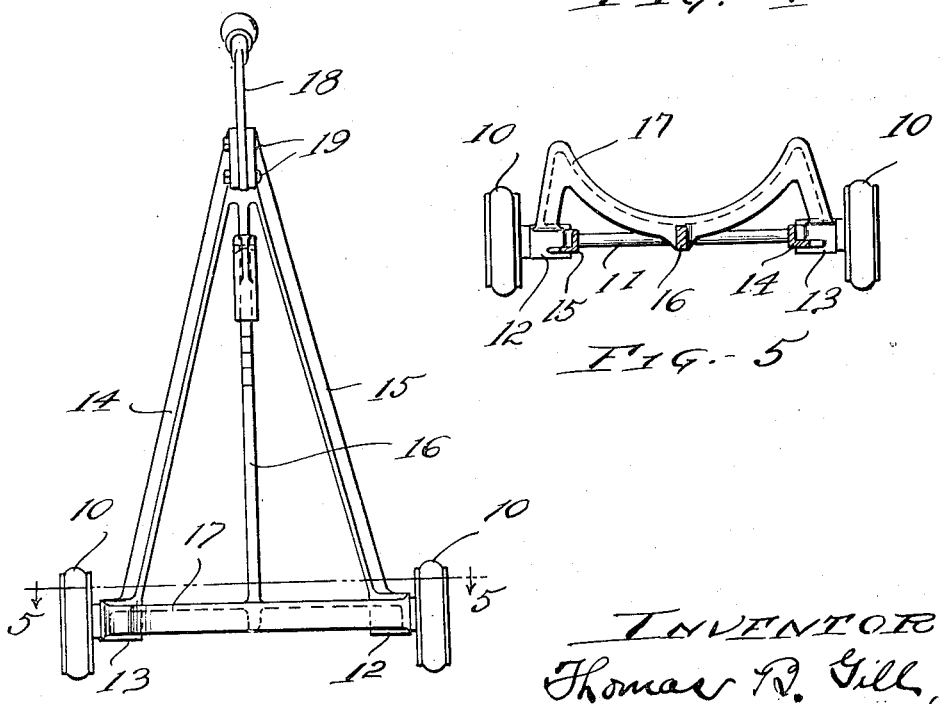
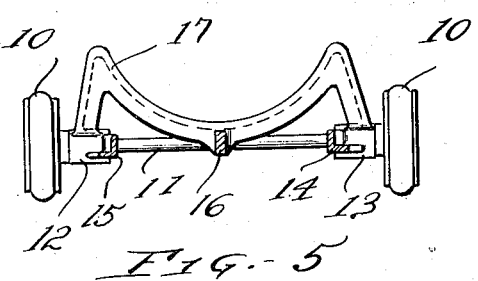

Patented Dec. 2, 1924.

1,517,901

UNITED STATES PATENT OFFICE.

THOMAS B. GILL, OF CLEVELAND, OHIO.

HAND TRUCK.

Application filed March 24, 1923. Serial No. 627,378.

*To all whom it may concern:*

Be it known that I, THOMAS B. GILL, a citizen of the United States, residing at Cleveland, in the county of Cuyahoga and State of Ohio, have invented a certain new and useful Improvement in a Hand Truck, of which the following is a full, clear, and exact description, reference being had to the accompanying drawings.

This invention relates to improvements in hand trucks such as are shown and described in my co-pending application Serial No. 503,854, filed September 28, 1921.

Briefly, a truck set forth in the above application embodies a two-wheel hand truck having a load engaging member so carried thereby that the load may be engaged and suspended by said member, which is adapted to engage a handle projecting laterally from the load, wherefore the load may be carried in a substantially upright position while the entire weight thereof is supported by said member. Constructions of this character are especially useful for handling loaded milk cans, ice cream tubs and the like.

One of the objects of the present invention is the provision of an adjustable load engaging member which is so positioned on the truck frame that the operator may use one hand for bringing the member into engagement with the load, while the other hand is used for tilting the truck to raise the load.

The means for carrying out my invention will be hereinafter fully described in connection with the accompanying drawings, and the essential features will be summarized in the claims.

In the drawings, Fig. 1 is a side elevation of a hand truck having a load suspended therefrom and embodying features of my invention; Fig. 2 is a front elevation of the truck; Figs. 3 and 4 are details of construction on an enlarged scale showing the load engaging member and locking device therefor; Fig. 5 is a section taken on the correspondingly numbered lines in Fig. 2.

I have shown my invention as embodied in a hand truck having wheels 10 supported on a shaft 11 at the base of the truck. The shaft is journaled in bearings 12 and 13 which are shown as comprising part of the frame. In the preferred form, the frame comprises a casting having outer arms 14 and 15, and an intermediate arm 16. The outer arms cooperate with the shaft to form a triangle while the intermediate arm is preferably disposed along a line which bisects the angle formed by the arms 14 and 15. Projecting laterally from the frame and disposed adjacent the base thereof, I have shown a guard 17 which may also be integral with the frame and be useful for preventing lateral movement of a suspended load. Adjacent the top of the frame, I have shown a handle 18 which may be joined to the frame as by securing members 19, and may be provided with a grip 20.

A truck of this character is adapted to engage a load and suspend it in substantially upright position, in such manner that the entire weight of the load is transmitted to the frame through the point of suspension. Accordingly, to provide a vertical adjustment for the load engaging member, I have illustrated a runner 25 which is movable relatively to the frame and which is adapted for adjusting the position of the load engaging member.

In the preferred form, the runner embodies a casting having spaced arms 27 and 28 which are disposed on opposite sides of the arm 16, and are arranged to project therebeyond, for receiving a shaft 29, on which a locking lever 30 may be mounted. The member 25 may be shaped, as at 31, to receive a handle 32 which projects laterally from the load 33. The opposite end of the runner is preferably shaped as at 34, to provide a shoulder which cooperates with serrations or teeth 26 on the frame.

The preferred means for locking the runner to the frame is illustrated by the lever 30, one end of which, as at 34, is shaped to provide a grip and the other end of which is rounded as at 35, to provide a cam which is adapted to engage the member 16 on the side opposite the teeth and thereby to lock the runner to the frame. The pivotal connection 29 is illustrated as being nearer the cam surface 35, wherefore the greater proportion of the lever is on the side of the pivotal connection adjacent the grip. Thus, the force of gravity tends to hold the lever in locked position, in which position, the lever is substantially horizontal as shown in Fig. 1. In unlocked position, the lever is upright as shown in Fig. 3. If desired, spring means may be associated with the runner for normally urging it into engagement with the frame.

From the foregoing description, it will be seen that my invention provides an adjustable load engaging member which enables the operator to use one hand for releasing the runner while employing the other hand for holding the truck in proper position for engaging a load. An advantage of this construction is that the load may be quickly locked to the frame, and that load stresses may be transmitted directly to the frame.

Having thus described my invention, I claim:—

1. In combination, a hand truck frame, having serrations along one side thereof, a runner carried by the frame and shaped to engage the serrations, the runner also having a hook-shaped portion adapted to engage a load, and a member associated with the runner and adapted to engage the frame with a variable pressure so as to lock the runner to said frame.

2. In a device of the character described the combination with a truck frame having spaced shoulders thereon, of a runner adapted to engage said shoulders and having a portion thereof shaped to engage and support a load, and a member pivoted to the runner and adapted to engage the frame on the side opposite the shoulders, said member being also adapted to engage the frame with variable pressure, for locking the runner thereto.

3. In combination, a truck frame having a portion thereof serrated, a runner having a shoulder cooperating with the serrated portion, and having a portion thereof shaped to engage and suspend a load, said runner also having a portion thereof projecting beyond the frame, and a hand lever pivotally connected to the runner on the portion projecting beyond the frame, the lever having a cam associated therewith, whereby the frame may be engaged with variable pressure for locking the runner thereto.

4. In combination, a hand truck frame having serrations along one side thereof, a runner carried by the frame and having one end thereof shaped to engage the serrations, the other end of the runner being shaped to engage a load, and means associated with the runner for engaging the side opposite the serrations with a variable pressure for locking it to the frame.

5. In combination, a truck frame having a member extending along the mid-portion thereof, said member being serrated along one side, a runner having a shoulder thereon adapted to engage the serrations and having provision for engaging a load, and means carried by the runner and adapted to engage the side of the frame opposite the serrations with variable pressure for locking the runner to the frame.

6. In combination, a hand truck frame, a runner carried thereby, said runner being movable relatively to the frame and having provision for engaging a load, and means including a cam for frictionally engaging and locking the runner to the frame.

7. The combination of a hand truck frame, a runner associated with the frame, said runner having provision thereon for engaging and suspending a load, and a member carried by the runner and movable relatively thereto, said member having a cam surface at one end thereof for frictionally engaging the frame for locking the runner thereto.

8. A two-wheeled truck frame having an upright portion disposed intermediate the wheels, a truck handle extending laterally from the frame, a load engaging member mounted on the frame beneath the handle, said member being selectively movable along the frame for engaging loads at various heights and a lever pivoted to said member and adapted to engage the frame for locking the member thereto, said lever having a cam surface thereon for frictionally engaging the frame, and said lever extending in the same general direction as the handle, whereby the operator may position the truck with one hand and the load engaging member with the other hand.

9. In combination, a hand truck frame, a runner carried thereby and adjustably mounted thereon, said runner projecting forwardly of the frame and adapted to engage and entirely suspend a load, and a lever pivotally mounted on the member on the outside of the frame, said lever having a cam surface at one end thereof for frictionally engaging the frame and locking the runner thereto.

10. In combination, a hand truck frame having a member extending longitudinally and along the mid-portion thereof, said member having serrations, a runner having provision thereon for engaging and suspending a load, said runner also having a shoulder cooperating with the serrations for transmitting load stresses directly to the frame, a pair of arms projecting laterally from the runner and disposed on opposite sides of the frame, and a lever pivotally mounted intermediate said arms and having one end thereof shaped to engage frictionally the side of the frame opposite the serrations whereby movement of the lever relatively to the runner locks the runner to the frame.

In testimony whereof, I hereunto affix my signature.

THOMAS B. GILL.